(12) United States Patent
Goldmeer et al.

(10) Patent No.: US 6,978,617 B2
(45) Date of Patent: Dec. 27, 2005

(54) POWER GENERATION SYSTEM USING A COMBUSTION SYSTEM AND A FUEL CELL

(75) Inventors: Jeffrey Goldmeer, Latham, NY (US);
Michael Kent Cueman, Niskayuna, NY (US); Michael Durling, Gansevoort, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

(21) Appl. No.: 10/771,795

(22) Filed: Feb. 4, 2004

(65) Prior Publication Data

US 2005/0252214 A1    Nov. 17, 2005

(51) Int. Cl.$^7$ ............................................ B63H 21/20
(52) U.S. Cl. ...................... 60/698; 60/716; 429/17; 440/3; 440/4
(58) Field of Search .................. 60/698, 716; 429/17; 440/3, 4

(56) References Cited

U.S. PATENT DOCUMENTS

| | | | |
|---|---|---|---|
| 4,343,611 A | 8/1982 | Scott-Scott | 440/45 |
| 4,424,042 A | 1/1984 | Gongwer | 114/338 |
| 4,648,322 A | 3/1987 | Heitz et al. | 114/338 |
| 4,658,589 A | 4/1987 | Sutrina | 60/646 |
| 5,045,004 A | 9/1991 | Kim | 114/20.2 |
| 5,117,635 A | 6/1992 | Blau | 114/20.2 |
| 5,239,821 A | 8/1993 | Guirguis | 60/221 |
| 5,702,273 A | 12/1997 | Cho et al. | 114/337 |
| 6,062,018 A | 5/2000 | Bussing | 60/39.39 |
| 6,610,193 B2 | 8/2003 | Schmitman | 204/270 |
| 6,846,208 B1 * | 1/2005 | Goldmeer et al. | 440/3 |
| 2003/0131584 A1 | 7/2003 | Butler et al. | 60/247 |
| 2005/0008904 A1 * | 1/2005 | Suppes | 429/9 |

FOREIGN PATENT DOCUMENTS

EP        0 189 659 A1    8/1996

OTHER PUBLICATIONS

Dean, A.J., "Recent Developments in Approaches to Pulsed Detonation Propulsion", American Institute of Aeronautics and Astronautics (2003), pp. 2-13.

Tangirala, V.E., et al., "Investigations of Cyclic Pulsed Detonation Processes: Experiments and Calculations", 19$^{th}$ International Colloquium on Dynamics and Explosions and Reactive Systems, pp. 1-14.

Groff, E.G., et al., "Steady Metal Combustor as a Closed Thermal Energy Source", Journal of Hydronautics (1978), vol. 12, No. 2, pp. 63-70.

(Continued)

*Primary Examiner*—Sheldon J Richter
(74) *Attorney, Agent, or Firm*—Scully, Scott, Murphy & Presser

(57) ABSTRACT

A regenerative fuel cell is combined with a combustion engine such as a Pulse Detonation Engine (PDE) to create a closed-loop power generation system. Stored hydrogen and oxygen are used by the regenerative fuel cell, and by the combustion engine, in which the reaction of the hydrogen and oxygen produces water in the gas phase (steam). The steam is used to generate work from a turbine shaft, which is used to drive a propulsion system for the marine vessel. After the steam passes through the turbine, the steam is cooled back to liquid water by a condenser, and stored with the water produced by the regenerative fuel cell. The stored water can be converted back into hydrogen and oxygen by using electrical power external to the closed-loop system. After regeneration of the water into hydrogen and oxygen, the closed-loop power system would be ready for operation again.

43 Claims, 2 Drawing Sheets

OTHER PUBLICATIONS

Hughes, T.G., et al., "Stored Chemical Energy Propulsion System for Underwater Applications", Journal of Energy (1983), vol. 7, No. 2, pp. 128-133.

Miller, Timothy F., "A Next Generation AUV Energy System Based on Aluminum-Seawater Combustion", Autonomous Underwater Vehicles 2002, San Antonio, Texas, Jun. 2002, pp. 1-9.

Greiner, Leonard, "Theoretical Performances with Hydrogen-Oxygen as Propellant of Perfect Rocket, Heat, and Fuel-Cell Engines in Underwater Missiles", Underwater Missile Propulsion (1967), pp. 31-50.

Smith, K.E., et al., "A Closed-Cycle Propulsion System for Deep Submergence", Underwater Missile Propulsion (1967), pp. 301-316.

"Hybrid Torpedo Propulsion (HTP)", retrieved from Department of Naval Research Web site: http://www.onr.navy.mil/sci_tech/engineering/docs/hybrd_torp_prop.pdf.

* cited by examiner

POWER GENERATION SYSTEM USING A COMBUSTION SYSTEM AND A FUEL CELL

BACKGROUND OF THE INVENTION

1. Field of the Invention

The present invention relates to power generation systems for marine vessels, and more specifically, to a closed-loop power and propulsion generation system for an underwater vessel combining a Pulse Detonation Engine with a regenerative fuel cell.

2. Prior Art

Vehicles that operate underwater are useful for performing tasks below the sea surface in such fields as deep-water salvage operations, navy and marine operations, underwater telecommunications, offshore petroleum and mining, and oceanographic research. Many of these applications are completed by small-scale underwater vehicles that can be either manned or unmanned (remotely operated). These unmanned vehicles are commonly known as Unmanned Underwater Vehicles (UUVs).

Generally, these small-scale underwater vessels have used conventional power systems. These traditional power/propulsion generation systems for submersible vessels have relied on stored electrical power, which has limited capacities for both duration and output power.

Prototype closed-loop systems for power generation use metal/water reactions in combination with a turbine to generate power. However, these metal reactions can produce ceramic particles that can damage the turbine. Other conventional power systems run an open cycle that consumes some type of fuel and the reaction products are expelled from the vessel.

The term closed loop cycle implies that none of the working fluid enters or leaves the power system while in operation. In contrast open-loop combustion systems, such as an aircraft or automotive engines, will eject or exhaust the products of the reaction used to generate power. In the case of an open system such as a missile or torpedo, ejecting mass can be used to generate thrust and propel the vessel. Vessels operating underwater that eject or exhaust mass tend to rise as they become more buoyant. To compensate, a series of onboard tanks can be filled with an amount of seawater equal to the ejected mass. However, this adds additional mechanical complexity and the potential for leaks into to the system. Further, by expelling this mass from the vessel, the vessel becomes more buoyant and tends to rise, thus making it more likely that the vehicle will be spotted or detected. This is a problem for vehicles involved in covert operations.

SUMMARY OF THE INVENTION

Therefore, it is an object of the present invention to provide a marine vessel that is neutrally buoyant so that the vessel does not rise or sink by providing a closed-loop power system in which mass is not ejected out of the vessel. Closed systems do not eject mass into the surroundings, which makes the vessel neutrally buoyant and potentially more maneuverable. Furthermore, it is another object of the present invention to be able to recharge or regenerate the power system simply, by use of an electrical connection.

Accordingly, an apparatus for power generation for a marine vessel is provided. The apparatus for a hybrid power generation system comprises a regenerative fuel cell capable of powering a marine vessel independently, and a combustion system combined with the regenerative fuel cell to simultaneously provide power for the marine vessel. The regenerative fuel cell can be combined with the combustion system in a closed loop. The regenerative fuel cell can be used for regular operation, while the combustion system can be used simultaneously with the regenerative fuel cell for high speed/high load requirements.

The regenerative fuel cell can be a unitized or discrete regenerative fuel cell. A discrete regenerative fuel cell system includes separate fuel cell and electrolyzer stack components, where a unitized regenerative fuel cell system combines the fuel cell and electrolyzer function into one stack. The combustion system comprises a constant volume system or a constant pressure system. The constant volume system can be a Pulse Detonation Engine (PDE), which can use a Deflagration to Detonation transition system. An oxygen supply and hydrogen supply are both in fluid communication with the regenerative fuel cell and the PDE to provide reactants for the regenerative fuel cell and the PDE to generate power for the marine vessel.

The power generation system further comprises steam formed by the combustion reaction in the PDE, and the steam is ducted from the PDE to a turbine, which can be a steam turbine, where it is expanded to rotate a shaft of the turbine. The rotating turbine shaft is used to generate electricity for a motor drive of the marine vessel in one embodiment. The rotating turbine shaft is used to turn the gear sets of a gear and clutch system of the marine vessel in a separate embodiment. The steam output from the turbine is ducted into a condenser, which is used to condense the steam into liquid water, which is then stored in an onboard water supply.

Using electricity supplied by an outside power supply, the regenerative fuel cell can reduce the water stored in the onboard water supply into hydrogen and oxygen, which is stored back into the hydrogen supply and the oxygen supply, respectively. The marine vessel can be an underwater vessel, which can be either manned or unmanned.

Further, a closed-loop system for power generation for a marine vessel is provided comprising a fuel cell for powering the marine vessel, and a combustion system combined with the fuel cell for powering the marine vessel, wherein the combustion system forms steam as a product of a combustion reaction between hydrogen and oxygen, and wherein the steam is converted back into hydrogen and oxygen for re-use by the fuel cell and the combustion system.

Further, a power generation method for a marine vessel is provided, the method comprising combining a fuel cell with a combustion system for powering a marine vessel, initiating a combustion reaction in the combustion system to form steam as a product of the combustion reaction, and converting the steam back into hydrogen and oxygen for re-use by the fuel cell and the combustion system. The method further comprises combining the fuel cell and the combustion system in a closed loop with the hydrogen and oxygen.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawing where:

DETAILED DESCRIPTION OF THE INVENTION

Although this invention is applicable to numerous and various types of power generation and propulsion systems for marine vessels, it has been found particularly useful in the environment of power generation systems for small-scale underwater vessels and UUVs. Therefore, without limiting the applicability of the invention to underwater vessels, the invention will be described in such environment.

Figure 1:
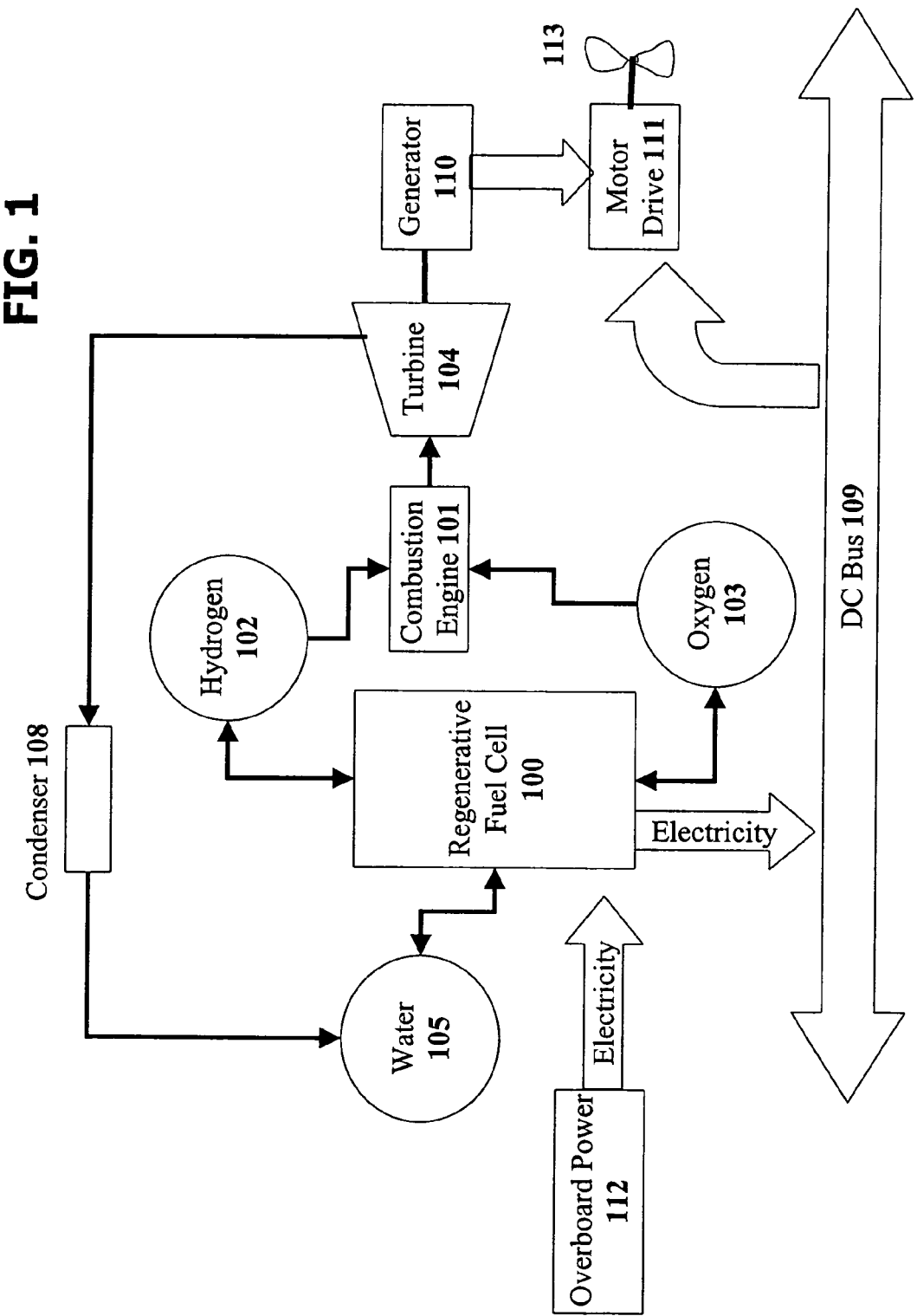
FIG. 1 illustrates a schematic representation of a first embodiment of a power generation system according to the present invention.

With reference to FIG. 1, there is a schematic representation of a closed loop power system for an underwater vehicle. Hydrogen is stored in a hydrogen supply 102 and oxygen is stored in an oxygen supply 103. The hydrogen supply 102 and oxygen supply 103 could be pressurized tanks containing the fuel and oxidizer, respectively, with the related control and safety elements. The hydrogen supply 102 and the oxygen supply 103 are in fluid communication with a regenerative fuel cell 100. Water is stored in a water supply 105, which is in fluid communication with the regenerative fuel cell 100. The hydrogen and oxygen gases stored in the hydrogen supply 102 and the oxygen supply 103, respectively, are the reactants for the regenerative fuel cell 100. The hydrogen and oxygen flow into the regenerative fuel cell 100, which produces direct current electricity and water. The electricity is provided to a DC bus 109, and the water is stored in the water supply 105 for later conversion back into $H_2$ and $O_2$.

This closed-loop system requires a fuel and oxidizer combination (hydrogen supply 102 and oxygen supply 103, respectively) that can be shared by both the fuel cell 100 and the combustion engine 101, and the products of the combustion reaction must be capable of being transformed back into the original reactants. These requirements are easily met by hydrogen and oxygen, which when reacted in stoichiometric proportion produce water vapor:

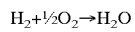

In a combustion system, work can be extracted from the resulting high temperature steam, and electrical power can be generated from a fuel cell using the same reactants. For this to be a true closed loop system, the reaction product must be converted back into the reactants. In this case the reaction product, water ($H_2O$), can be chemically reduced into the constituent hydrogen ($H_2$) and oxygen ($O_2$) with the addition of electricity:

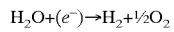

This process is known as electrolysis. In the present invention, an external source would supply the required electrical power for the electrolysis reaction.

The combustion engine 101 is in fluid communication with the hydrogen supply 102 and the oxygen supply 103. The combustion engine 101 uses oxygen from the oxygen supply 103 and hydrogen from the hydrogen supply 102 to initiate a combustion reaction between the oxygen and hydrogen. The hydrogen and oxygen are used as the fuel and oxidizer, respectively, and produce water vapor (steam) as a product of the combustion reaction. An appropriate control system is used to regulate the amount of oxygen and hydrogen to be injected into the combustion engine 101. The amount of hydrogen and oxygen injected into the combustion engine 101 is proportional to the amount of power required by the marine vessel.

The combustion engine 101 can be a constant pressure combustion system or a constant volume (pressure rise) combustion system. Combustion systems such as candles, home heaters, gas ovens and stoves, etc., are deflagration-based combustion reactions, which are constant-pressure systems with sub-sonic flows. In contrast, constant volume combustion reactions generate an increase in pressure within the system, and may involve supersonic flows and shock waves. Thus, the output pressure from a constant volume reaction will be larger than the inlet pressure of the reactants, which will lead to increased power generation for a specific fuel consumption, leading to increased overall system efficiency. One example of a constant volume (increasing pressure) based system is a Pulse Detonation Engine (PDE).

A PDE-based combustion system provides an efficiency increase to the system over conventional (deflagration) combustion systems. A PDE-based combustion system is a pulsed system, in which detonation reactions generate a shock wave, which generates a very short duration pressure pulse. If a time-series of pressure pulses are created and at a sufficiently high enough frequency, the time integrated pressure will be larger than the initial pressure. This time averaged pressure in the combustion exhaust stream would increase the output power from the turbine for a specific fuel flow rate, thus increasing the efficiency of the overall system.

The Pulse Detonation Engine can use a Deflagration to Detonation Transition (DDT) based system. A DDT system uses a one-dimensional tube that is closed on one end. The fuel (hydrogen) and oxidizer (oxygen) are injected into the closed end. An energy source (such as a spark plug, etc) is used to ignite the mixture of the fuel and oxidizer. The combustion wave then begins to propagate towards the open end of the tube at subsonic speeds (deflagration). As the combustion wave propagates, it accelerates until a shock wave is formed and the flow transitions to sonic speeds (detonation). The tube is then purged and the process can then be repeated.

Alternatively, other type of engines (constant volume or constant pressure) can be used as the combustion engine 101, which employ similar combustion reactions between hydrogen and oxygen.

The water vapor (steam) generated by the combustion reaction in the combustion engine 101 is ducted to a turbine 104, which expands the steam to generate power for a turbine shaft. Generally, the turbine 104 could be any type of turbine capable of extracting work from the steam, but could specifically be a steam turbine. The shaft of the turbine 104 is connected to a generator 110 that is directly connected to a motor drive 111. The generator can also be connected to the DC bus 109 to provide electrical power for the motor drive 111. In the present embodiment, the electrical power from the generator 110 is sent directly to the motor drive 111, which drives the propulsion system 113.

Steam exiting the turbine 104 is ducted to a condenser 108, which is used to condense the steam into liquid water, which is stored in the water supply 105. For a system operating in an underwater vessel, the condenser 108 could take advantage of the nearly unlimited supply of cold, ambient water available exterior to the vessel for use as a coolant. Such cold water is nearly in infinite supply for an underwater vessel.

The stored water in the water supply 105 is converted back into $H_2$ and $O_2$ by running the regenerative fuel cell 100 as an electrolysis system, which would require electrical power to be fed by an outside or overboard power supply 112. If an external power source such as the overboard power supply 112 is used to feed electricity back into the regenerative fuel cell 100, the regenerative fuel cell 100 would reduce the water from the water supply 105 back into $H_2$ and $O_2$. Thus, this is a regenerative system, in which an external power source is used to re-charge the regenerative fuel cell 100. This system does not exhaust any of the water, hydrogen or oxygen from the cycle to the local ambient environment.

Figure 2:
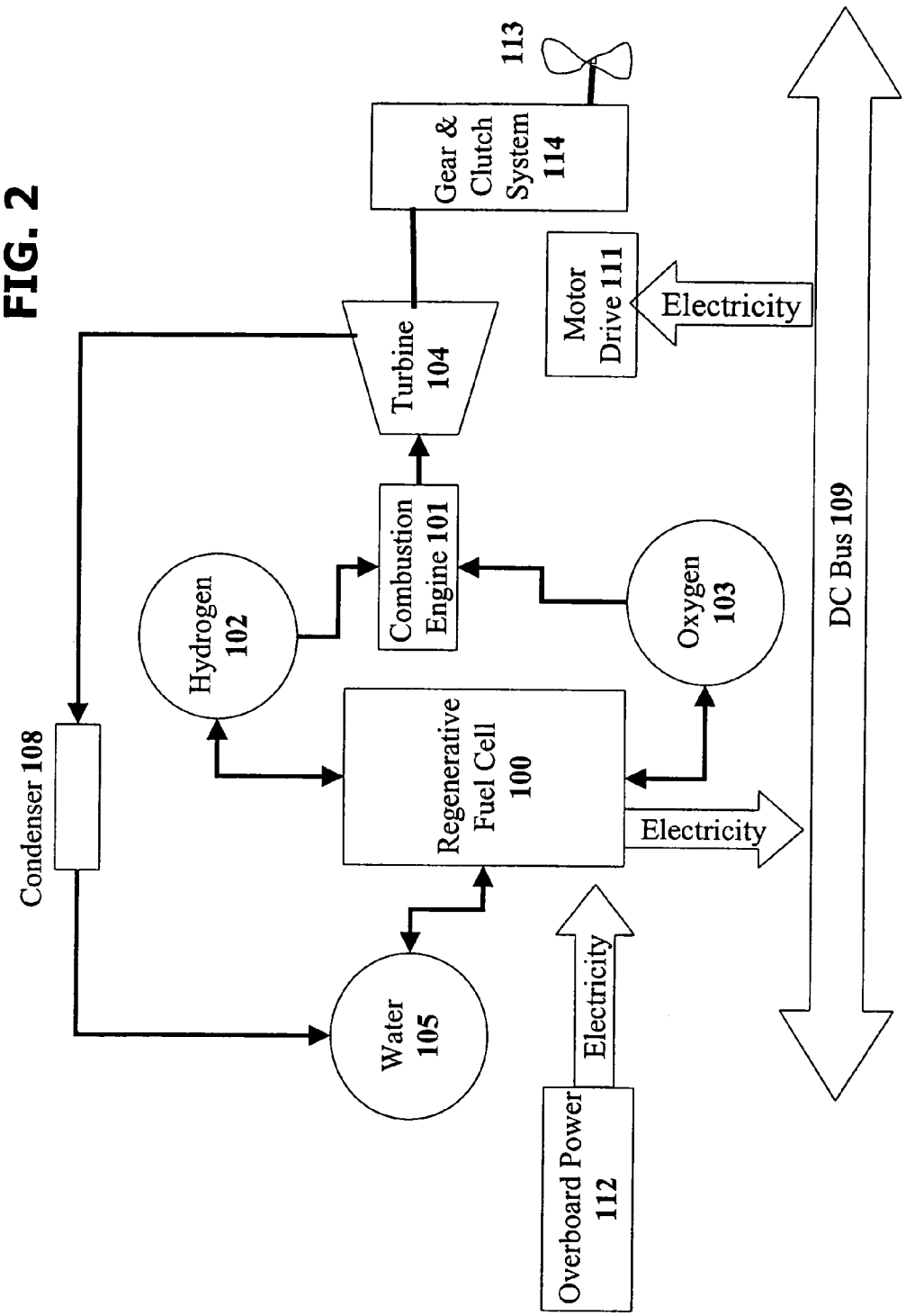
FIG. 2 illustrates a schematic representation of a second embodiment of a power generation system according to the present invention.

A second embodiment of the present invention is provided in FIG. 2. This embodiment is similar to the first embodiment, except that propulsion is derived from a direct-drive system. The shaft of the turbine 104 is connected to a gear and clutch system 114. When a combustion reaction is initiated in the combustion engine 101, then the gear and clutch system 114 is engaged, and the shaft of the turbine 104 turns the gear sets and drives the propulsion system 113.

The regenerative fuel cell 100 can operate independently of the combustion engine 101 or simultaneously with the combustion engine 101. The regenerative fuel cell 100 is used for operational modes requiring low power while the combustion engine 101 is off or remains idle. The combustion engine 101 supplements the regenerative fuel cell 100 for operational modes requiring high power. The regenerative fuel cell 100 continues to operate at all times to provide the basic minimum power required by the underwater vessel. Low power can be used when a low speed is required, while a high power can be used when a high speed is required.

The above descriptions of the present invention are only two of the embodiments of the present invention. Various other combinations of power systems are also possible, in which different types of combustion engines (constant pressure systems or constant volume systems) are used in combination with the regenerative fuel cell. The fuel cell can be a unitized or discrete regenerative fuel cell. A discrete regenerative fuel cell system includes separate fuel cell and electrolyzer stack components, where a unitized regenerative fuel cell system combines the fuel cell and electrolyzer function into one stack. Further, the marine vessel can be either manned or unmanned.

The present invention provides several advantages that solves the problems with prior art methods. A regenerative fuel cell is combined with a Pulse Detonation Engine (combustor) to create a closed-loop power generation system. The closed-loop system ensures that material is not ejected out of the vessel. Thus, the vehicle maintains neutral buoyancy, which is important for the maneuvering capability of submersible vehicles, and limits external disturbances that could add to the vehicle's signature.

Further, the system only requires an electrical connection to regenerate the fuel supply. Thus, a simple electrical connection is able to refuel the vehicle and it does not require any additional fuel. The reactants or products are not exhausted.

The dual power systems allow for both normal power levels and boost or high-load conditions. The two power cycles provide very different power outputs. The fuel cell provides nominal steady power when the marine vessel requires a low speed for base-load applications. The combustion engine provides high power output for short periods of time when the marine vessel requires a high speed, by supplementing the fuel cell when a high speed is required.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for power generation for a marine vessel comprising:
    a regenerative fuel cell capable of powering said marine vessel independently; and
    a combustion system combined with said regenerative fuel cell to simultaneously provide power for said marine vessel.

2. The apparatus for power generation for a marine vessel of claim 1, wherein said marine vessel is an underwater vessel, which can be either manned or unmanned.

3. The apparatus for power generation for a marine vessel of claim 1, wherein said regenerative fuel cell and said combustion system are combined in a closed-loop.

4. The apparatus for power generation for a marine vessel of claim 3, wherein said combustion system comprises a constant pressure system.

5. The apparatus for power generation for a marine vessel of claim 3, wherein said combustion system comprises a constant volume system.

6. The apparatus for power generation for a marine vessel of claim 5, wherein said constant volume system comprises a Pulse Detonation Engine.

7. The apparatus for power generation for a marine vessel of claim 6, wherein said regenerative fuel cell is independently used for driving a propulsion system of said marine vessel when a low power is required, and wherein said regenerative fuel cell and said Pulse Detonation Engine are simultaneously used for driving a propulsion system of said marine vessel when a high power is required.

8. The apparatus for power generation for a marine vessel of claim 6, wherein the Pulse Detonation Engine uses a Deflagration to Detonation transition based system.

9. The apparatus for power generation for a marine vessel of claim 6, further comprising a hydrogen supply and an oxygen supply, wherein said hydrogen supply and oxygen supply are both in fluid communication with said regenerative fuel cell and said Pulse Detonation Engine.

10. The apparatus for power generation for a marine vessel of claim 9, wherein said regenerative fuel cell uses said hydrogen and oxygen to generate direct current electricity to drive a propulsion system for said marine vessel.

11. The apparatus for power generation for a marine vessel of claim 9, wherein hydrogen from said hydrogen supply and oxygen from said oxygen supply are injected into said Pulse Detonation Engine to initiate a combustion reaction between said hydrogen and oxygen to provide power for said marine vessel, wherein said combustion reaction forms steam.

12. The apparatus for power generation for a marine vessel of claim 11, wherein said steam is ducted from said Pulse Detonation Engine to a turbine and expanded to rotate a shaft of said turbine.

13. The apparatus for power generation for a marine vessel of claim 12, further comprising a generator that uses said rotating turbine shaft to generate electricity to drive a propulsion system for said marine vessel.

14. The apparatus for power generation for a marine vessel of claim 12, further comprising a gear and clutch system that uses said rotating turbine shaft to turn gear sets of said gear and clutch system to drive a propulsion system for said marine vessel.

15. The apparatus for power generation for a marine vessel of claim 12, further comprising a condenser that condenses said steam from said turbine into water, wherein said water is stored in a water supply.

16. The apparatus for power generation for a marine vessel of claim 15, wherein said regenerative fuel cell uses electricity to reduce the water in said water supply into hydrogen and oxygen.

17. The apparatus for power generation for a marine vessel of claim 16, wherein said hydrogen is stored in said hydrogen supply and said oxygen is stored in said oxygen supply.

18. A closed-loop system for power generation for a marine vessel comprising:
 a fuel cell for powering said marine vessel; and
 a combustion system combined with said fuel cell for powering said marine vessel;
 wherein said combustion system forms steam as a product of a combustion reaction between hydrogen and oxygen, wherein said steam is converted back into hydrogen and oxygen for re-use by said fuel cell and said combustion system.

19. The closed-loop system for power generation for a marine vessel of claim 18, wherein said marine vessel is an underwater vessel, which can be either manned or unmanned.

20. The closed-loop system for power generation for a marine vessel of claim 18, wherein said fuel cell is a regenerative fuel cell.

21. The closed-loop system for power generation for a marine vessel of claim 20, wherein said combustion system comprises a constant pressure system.

22. The closed-loop system for power generation for a marine vessel of claim 20, wherein said combustion system comprises a constant volume system.

23. The closed-loop system for power generation for a marine vessel of claim 22, wherein said constant volume system comprises a Pulse Detonation Engine.

24. The closed-loop system for power generation for a marine vessel of claim 23, wherein said regenerative fuel cell is used for driving a propulsion system of said marine vessel when a low power is required, and wherein said regenerative fuel cell and said Pulse Detonation Engine are simultaneously used for driving a propulsion system of said marine vessel when a high power is required.

25. The closed-loop system for power generation for a marine vessel of claim 23, wherein the Pulse Detonation Engine uses a Deflagration to Detonation transition based system.

26. The closed-loop system for power generation for a marine vessel of claim 23, wherein said hydrogen and oxygen are supplied from a hydrogen supply and an oxygen supply, respectively, and wherein said hydrogen supply and oxygen supply are both in fluid communication with said regenerative fuel cell and said Pulse Detonation Engine.

27. The closed-loop system for power generation for a marine vessel of claim 26, wherein said regenerative fuel cell uses said hydrogen and oxygen to generate electricity to drive a propulsion system for said marine vessel.

28. The closed-loop system for power generation for a marine vessel of claim 26, wherein said steam is ducted from said Pulse Detonation Engine to a turbine and expanded to rotate a shaft of said turbine.

29. The closed-loop system for power generation for a marine vessel of claim 28, further comprising a generator that uses said rotating turbine shaft to generate electricity to drive a propulsion system for said marine vessel.

30. The closed-loop system for power generation for a marine vessel of claim 28, further comprising a gear and clutch system that uses said rotating turbine shaft to turn gear sets of said gear and clutch system to drive a propulsion system for said marine vessel.

31. The closed-loop system for power generation for a marine vessel of claim 28, further comprising a condenser that condenses said steam from said turbine into water, wherein said water is stored in a water supply.

32. The closed-loop system for power generation for a marine vessel of claim 31, wherein said regenerative fuel cell uses electricity to reduce the water in said water supply into hydrogen and oxygen.

33. The closed-loop system for power generation for a marine vessel of claim 32, wherein said hydrogen is stored in said hydrogen supply and said oxygen is stored in said oxygen supply.

34. A power generation method for a marine vessel, the method comprising:
 combining a fuel cell with a combustion system for powering a marine vessel;
 initiating a combustion reaction in said combustion system to form steam as a product of said combustion reaction; and
 converting said steam back into hydrogen and oxygen for re-use by said fuel cell and said combustion system.

35. The power generation method for a marine vessel of claim 34, wherein said fuel cell and said combustion system are combined in a closed loop with said hydrogen and oxygen.

36. The power generation method for a marine vessel of claim 35, wherein said steam is first condensed into water and then reduced into hydrogen and oxygen.

37. The power generation method for a marine vessel of claim 36, wherein said fuel cell is a regenerative fuel cell.

38. The power generation method for a marine vessel of claim 37, wherein said combustion system comprises a constant pressure system.

39. The power generation method for a marine vessel of claim 37, wherein said combustion system comprises a constant volume system.

40. The power generation method for a marine vessel of claim 39, wherein said constant volume system comprises a Pulse Detonation Engine.

41. The power generation method for a marine vessel of claim 40, wherein said Pulse Detonation Engine uses a Deflagration to Detonation transition based system.

42. The power generation method for a marine vessel of claim 40, wherein said regenerative fuel cell is used to provide power independently to said marine vessel when a low power is required by said marine vessel, while said Pulse Detonation Engine remains idle.

43. The power generation method for a marine vessel of claim 40, wherein said combustion reaction is initiated in said Pulse Detonation Engine to provide power to said marine vessel when a high power is required by said marine vessel.

* * * * *